Jan. 31, 1967     P. M. LARRABURU     3,302,016
OPTICAL COLLIMATING SYSTEM

Filed Aug. 21, 1964

INVENTOR.
PHILIP M. LARRABURU
BY Elliott & Pastoriza
ATTORNEYS

United States Patent Office 3,302,016
Patented Jan. 31, 1967

3,302,016
OPTICAL COLLIMATING SYSTEM
Philip M. Larraburu, Sylmar, Calif., assignor, by mesne assignments, to Textron Electronics, Inc., a corporation of Delaware
Filed Aug. 21, 1964, Ser. No. 391,256
5 Claims. (Cl. 240—41.3)

This invention relates generally to optics and more particularly to a novel optical collimating system particularly useful for obtaining a collimated beam from a carbon arc light source.

Usually diffuse light sources such as carbon arc lamps are only useful in projection systems. It is very difficult to use such sources to provide a collimated beam of light such as is desirable in solar energy simulators because of the erratic nature of the carbon arc itself.

By employing lenticular type lenses however, it is possible to provide, to some extent, a collimated beam from a carbon arc. In such a system, the carbon arc is located at the primary focus and is imaged by an elliptic reflector through first and second lenticular lenses. The first lenticular lens is uniformly illuminated and forms numerous images of the arc on the second lenticular lens. This latter lens in turn forms numerous superimposed images of the first lenticular lens at the re-imaging plane wherein theoretically uniform illumination is created. By uniform illumination is meant constant intensity illumination in a cross-section of the beam.

With the foregoing arrangement, the collimated beam may be produced by positioning a field lens at the re-imaging plane where the image of the first lenticular lens is formed. This field lens serves to gather all of the light and pass it into a projection lens which may then be considered as the source of a collimated beam.

The projection lens is disposed in the focal plane of a collimating lens, the purpose of the projection lens being to image the field lens into the collimator so as to transfer the uniformity of illumination existing at the field lens onto the collimator.

Because of the nature of the lenticular lens employed and the fact that a diffused source is involved, various problems are encountered with the foregoing system. Thus, the field lens itself in imaging the second lenticular lens into the projection lens is actually non-uniformly illuminated. There are a series of bright spots or mosaic-like patterns and these spots suffer from chromatic aberration resulting in a dispersion in the beam of light. Moreover, parallel bundles of light issuing from each bright spot on the projection lens cross over and produce a mosaic pattern in front of the collimator.

Finally, as a consequence of the non-uniform effects produced at the projection lens, the collimator forms at infinity an image of this non-uniform pattern thus affecting the uniformity of the beam a short distance from the collimator.

With all of the foregoing in mind it is accordingly a primary object of this invention to provide an optical collimating system incorporating generally the above-described arrangement for providing a collimated beam from a diffuse source such as a carbon arc and yet designed such as to provide a substantially uniform beam in cross-section.

More particularly, it is an object to provide an optical collimating system for a carbon arc in which bright spots are avoided so that chromatic images of the second lenticular lens onto the projection lens is diffused.

More generally, it is an object to provide a collimated beam of light using lenticular lenses and a carbon arc lamp, in which no chromatic aberration disturbs the beam, there is not generated any mosaic pattern, and the image of the source produced at infinity by the collimator is a uniformly illuminated disc.

Briefly, these and other objects and advantages of this invention are attained by providing a diffusing coating on one surface of the field lens in the re-imaging plane of the lenticular lens system. This diffusing surface or coating functions to integrate light falling thereon in such a manner as to provide the desired uniform cross-section collimated beam ultimately provided by the collimating lens.

A better understanding of the invention will be had by referring to the accompanying drawings, in which.

Figure 1:
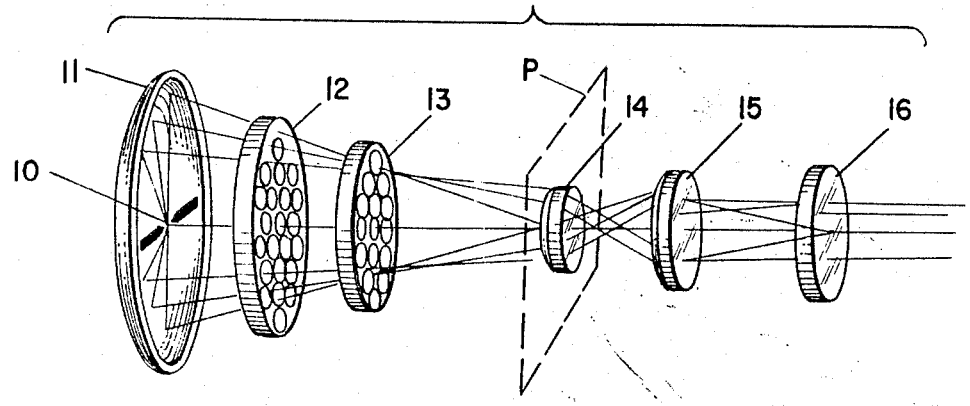
FIGURE 1 is a perspective view illustrating portions of an optical system for collimating a beam from a carbon arc light source.

Referring first to FIGURE 1, there is shown a typical carbon arc light source 10 positioned at a focus of an elliptical reflector 11. The elliptical reflector images the carbon arc through a first lenticular lens 12 which serves to form numerous images of the arc on a second lenticular lens 13. The second lenticular lens 13 in turn functions to form numerous superimposed images of the entire first lenticular lens 12 at a re-imaging plane P thereby creating substantially uniform illumination.

To form a collimated beam, the usual method is to position a field lens 14 at the re-imaging plane P which functions to gather light from the second lenticular lens 13 and form an image of this lens on a projection lens 15. The projection lens 15 in turn is positioned in the focal plane of a collimating lens 16 and functions to image the field lens into the collimator so as to transfer the uniformity of illumination existing on the field lens onto the collimator. Thus, by transferring all of the energy entering into the field lens to the collimator, losses are minimized.

With the foregoing system as described thus far, the projection lens will be non-uniformly illuminated. This non-uniformity of illumination is a consequence of the projection of the image of the second lenticular lens onto the projection lens by the field lens.

Figures 2, 3, 4:
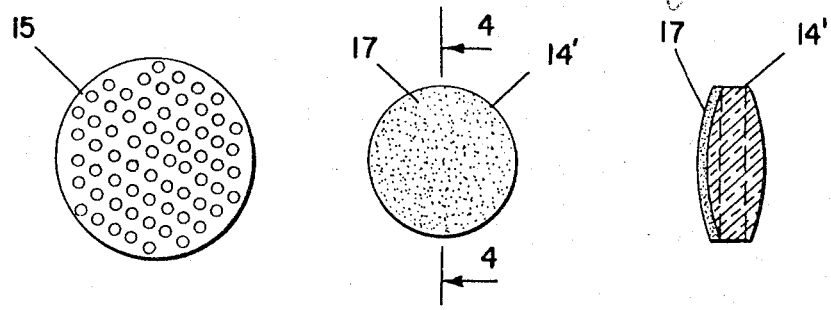
FIGURE 2 is a plan view of a projection lens incorporated in the system of FIGURE 1 useful in explaining certain principles of operation of the system.
FIGURE 3 illustrates a diffusing surface adapted to be used in the system of FIGURE 1 in accordance with the instant invention.
FIGURE 4 is a cross-section taken generally in the direction of the arrows 4—4 of FIGURE 3.

With particular reference to FIGURE 2, it will be noted that the imaging by the field lens of the second lenticular lens 13 results in a mosaic pattern or a series of bright spots on the projection lens 15. When viewed from the right side of the collimating lens 16 of FIGURE 1, each of these spots appears to be surrounded by a colored ring which creates a distortion in the beam of light. This dispersion is particularly harmful since each spot is supposed to act as an individual source.

Further, the various parallel bundles of light issuing from each bright chromatic spot on the projection lens, cross over and produce a similar mosaic pattern in front of the collimator so that uniformity of the beam a short distance from the collimator is relatively poor.

Referring now to FIGURE 3, there is illustrated a field lens 14' which, in accordance with this invention, is substituted for the field lens 14' in FIGURE 1. This field lens 14' includes a diffused surface or coating 17 on one side. This diffusion, which may take the form of a frosting-like surface, functions to integrate all of the light falling on it in such a way that it does not absorb a significant amount of light but disrupts the formation of chromatic images of the second lenticular lens on the projection lens.

FIGURE 4 illustrates the diffusing field lens 14 in cross-section, the diffusing side being positioned towards the second lenticular lens when positioned in the optical system of FIGURE 1.

By using the diffusing surface to integrate the light, there is provided a perfect collimated beam of light notwithstanding that lenticular lenses are used and that the initial source is a carbon arc lamp.

In addition, no chromatic aberration disturbs the beam, and there is no mosaic pattern anywhere established. The image of the source produced at infinity by the collimator 16 appears as a uniformly illuminated disc.

The present invention has thus provided a unique collimating system particularly useful for carbon arc lamp sources so that for the first time such sources may be used for solar simulation.

I claim:

1. An optical collimating system for obtaining a collimated beam from a diffused radiant energy source, including in combination: a lenticular lens means positioned in front of said source to form images from said radiant energy at a point defining a re-imaging plane; a field lens disposed at said reimaging plane for gathering light from said lenticular lens means and projecting an image thereof; and a diffusing means on said field lens for integrating light falling thereon to render uniform the projected image from said field lens.

2. A system according to claim 1, further including: a collimating lens; and a projection lens disposed between said field lens and said collimating lens to receive the image projected from said field lens and transfer the illumination on the field lens onto the collimating lens.

3. An optical collimating system for obtaining a collimated beam from a diffused radiant energy source, comprising, in combination: a field lens; first and second lenticular lens positioned between said source and field lens such that said first lens forms numerous images of said source onto said second lens and said second lens forms numerous superimposed images of said first lens at a point defining a re-imaging plane, said field lens being disposed at said re-imaging plane; a collimating lens; a projection lens disposed between said field lens and said collimating lens, said field lens gathering light from said second lenticular lens and projecting an image thereof into said projection lens, said projection lens in turn imaging said field lens into said collimating lens to transfer the illumination on the field lens onto the collimating lens; and a diffusing means on said field lens for integrating light falling thereon to render uniform the formation of said image of said second lens into said projection lens.

4. A system according to claim 3, in which said diffusing means comprises a frosting-like coating formed on one surface of said field lens.

5. A system according to claim 4, in which said diffused radiant energy source comprises a carbon arc light and elliptical reflector therefor.

References Cited by the Examiner

UNITED STATES PATENTS

| | | | |
|---|---|---|---|
| 2,063,312 | 12/1936 | Hopkins | 88—24 |
| 2,275,602 | 3/1942 | Beck et al. | 88—24 |
| 2,326,970 | 8/1943 | Rantsch | 88—24 |
| 2,691,320 | 10/1954 | Borberg | 352—198 |
| 2,803,163 | 8/1957 | Ulffers | 88—24 |

NORTON ANSHER, *Primary Examiner.*

C. C. LOGAN, *Assistant Examiner.*